March 16, 1954     R. C. SCHULTZ     2,672,404
REACTION AND SEPARATION VESSEL
Filed Dec. 23, 1942     3 Sheets-Sheet 2

Rudolph C. Schultz Inventor
By O. L. Young Attorney

March 16, 1954 R. C. SCHULTZ 2,672,404
REACTION AND SEPARATION VESSEL
Filed Dec. 23, 1942 3 Sheets-Sheet 3

Rudolph C. Schultz Inventor
By C.R. Young Attorney

Patented Mar. 16, 1954

2,672,404

UNITED STATES PATENT OFFICE 2,672,404

REACTION AND SEPARATION VESSEL

Rudolph C. Schultz, Roselle Park, N. J., assignor to the United States of America as represented by the United States Atomic Energy Commission Application December 23, 1942, Serial No. 469,935

8 Claims. (Cl. 23—252)

The present invention relates to the art of reaction and separation vessels and more specifically to a reaction or separation vessel for use where one product of the reaction is a solid adherent material which is separated from fluid reactants.

It has been found that solid and semisolid adherent materials produced in reaction and separation vessels and collected on the interior walls and elements of such vessels interfere with the proper regulation and control of temperature in the vessels. This invention provides a novel scraper construction which effectively scrapes away and removes such adherent materials from the walls of such reaction and separation vessels and also from the scrapers themselves.

It is the object of this invention to provide a reaction and separation vessel having intermittently operated scrapers therewithin that will remove adherent solids and semisolids from each other.

It is the further object of this invention to provide a reaction and separation vessel having interacting scrapers therein that will intermittently scrape solids and semisolids from the interior surfaces of said vessels as well as from each other.

Other objects and advantages of the invention will be readily apparent from the following disclosure of preferred embodiments of the invention illustrated in the accompanying drawings in which.

Figure 1:
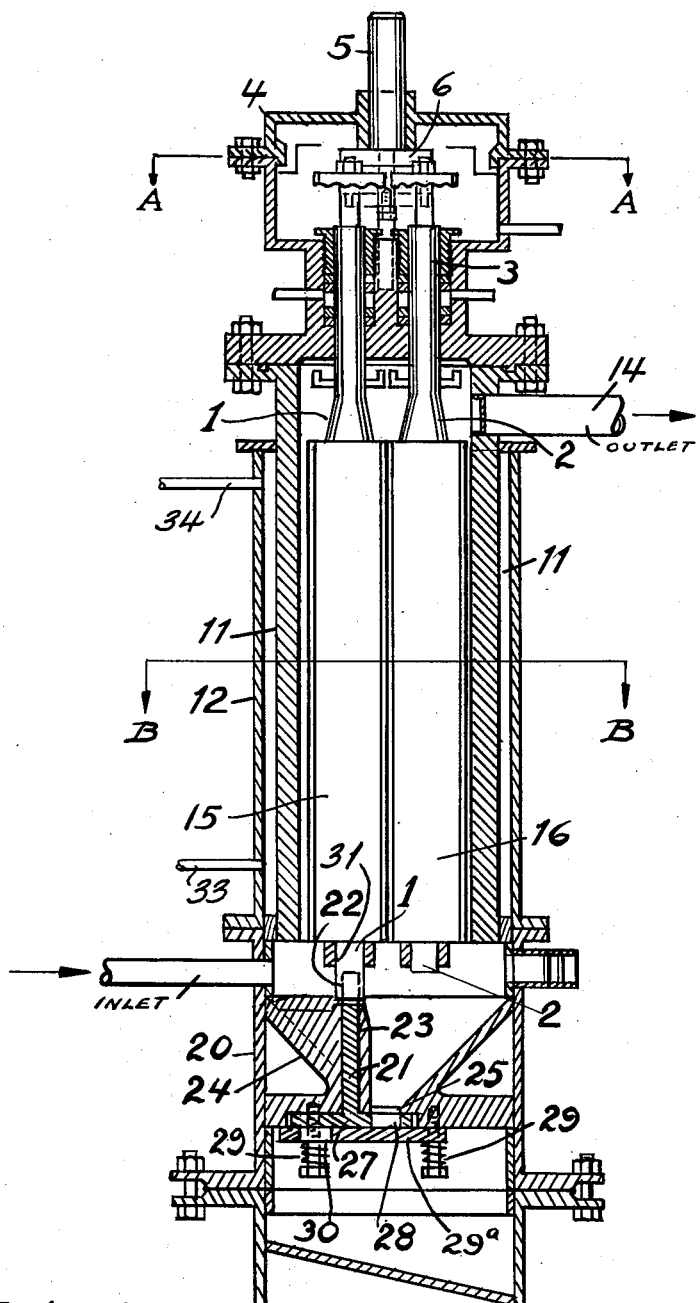
Fig. 1 is a sectional elevation of one form of the reaction vessel showing a suitable form of scraper member driving mechanism, the scraping members, and the vessel wall construction.

Many chemical reactions give rise to a liquid or solid product which separates from the reacting fluids. In some instances the solid or liquid product produced is not adherent and is thus readily removable from the reaction vessel by means such as sedimentation, filtration, centrifugation or extraction and without any difficulty caused by the adherence of the material to the side walls of the vessels. There are other instances, however, where the material adheres closely to the side walls of the vessel or other equipment used therein such as the stirrers, thermometers and the like, giving great difficulty in cleaning and in temperature regulation and control since these materials also adhere to the cooling or heating surfaces.

The above problem is not necessarily limited to chemical reactions but the same occurs in certain physical changes which give rise to the formation of a solid or liquid phase. As an example of the chemical reactions, one would readily note carbonization processes in which organic materials such as hydrocarbons or other compounds are heated to a decomposition or cracking temperature in the course of which lower boiling products are produced along with heavy tars and coke. These heavy materials have a great tendency to coat and firmly adhere to the walls of the vessel from which they must be removed periodically or by some continuous means. The production of carbon black is a particular instance among the above types of carbonizations. Natural gas is burned in contact with a cooled plate so that the combustion is incomplete and carbon in finely divided form coats the plate from which it must be removed from time to time. Among the physical reactions for which the present invention may be helpful may be cited cooling processes in which liquid or solid materials precipitate from the cooled vapor. The precipitants may be in the form of liquid droplets caused by chilling below the dew point of the vapor but the chilling may also be sufficiently great so as to cause solidification or icing on the reactor walls. Such processes may be used in order to produce thoroughly dry vapors and in all such processes the present methods will be found to be of advantage. The present invention also finds application in crystallization processes, evaporation processes in which solid materials are precipitated, and in many other operations.

Another physical process in which the present invention is useful is the dewaxing of oils. The oil is diluted with naphtha or other dewaxing solvent and is then cooled by passing through various forms of chillers. These are generally double walled vessels, the oil passing through the interior and cold brine being passed through the jacket. In such processes it will be appreciated that the coldest temperature reached is on the inner surface of the chiller wall and it is here that the wax separates so that it adheres closely to the wall. Various means are necessary to scrape the walls of the chiller which will otherwise rapidly freeze up and become useless.

In all of the various forms of apparatus designed for carrying out the above processes, mechanisms have been produced for scraping the side walls, but they have not been altogether satisfactory. The scrapers themselves are frequently found to slowly gather solid materials and eventually the apparatus must be taken down in order to free the stirring or scraping mechanism itself. In the present invention an apparatus is disclosed in which such shut-downs are not required since the mechanism is arranged not only to carefully scrape the side walls of the apparatus but also to scrape the scraping mechanism itself at regularly recurring intervals.

Figure 2:
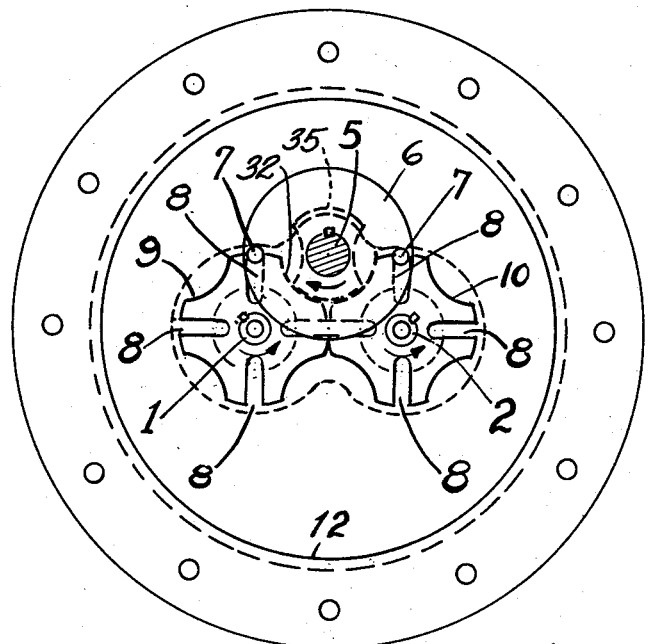
Fig. 2 is a diagrammatic section taken along the line A—A of Fig. 1 showing the driving mechanism.

Referring to Fig. 1, numerals 1 and 2 denote a pair of parallel shafts mounted vertically within the upper and lower bearings 3 and 31, respectively. The upper ends of the shafts pass through the upper bearing and into a housing 4. A driveshaft 5 enters the top of the housing and carries a circular driver 6 which is best seen in Fig. 2 which is a diagrammatic sectional view taken through the housing 4. The shaft 5 is parallel to shafts 1 and 2 and rigidly carries the driver 6 which is supplied with two rigid pins, each marked 7, at opposite ends of a diameter. The pins project perpendicularly downward from the surface of the driver 6 and are adapted to engage in the slots 8 which are cut into the driven wheels 9 and 10 respectively. These latter wheels are mounted on the shafts 1 and 2 respectively and can be seen clearly in Fig. 2 and in section in Fig. 1. The shaft 1 is locked in a stationary position, by means of the arcuate portion of a cam-shaped element 35 carried by the driver 6 and engaging the arcuate hollow 32 in the edge of wheel 9, while the wheel 10 and shaft 2 are driven through 90°. Similarly, shaft 2 is then locked while shaft 1 is driven through an arc of 90°. The above mechanism contained within the housing 4 is known as a Geneva wheel drive and is no part of the present invention. It may be replaced with many other types of drive but it is of particular advantage in the present case where it is desired to drive one of the shafts 1 or 2 while the other is locked in stationary position. The driving wheel is preferably driven slowly at a constant speed. The shafts 1 and 2 will not be driven at a constant speed but this has been found to be of no particular consequence.

Below the housing 4 there is the main housing which is provided with double walls 11 and 12. There is an inlet 13 at the lower end of the main housing and an outlet 14 from the upper end thereof for introduction and withdrawal of fluid materials and there is an inlet 33 and an outlet 34 for the circulation of a temperature regulating medium between the walls 11 and 12. Mounted integrally on the shafts 1 and 2 and within the main housing are two scraper members generally indicated by numerals 15 and 16 in Fig. 1, but the shape and conformation of these scrapers can best be seen in Fig. 3 which is a section of the apparatus shown in Fig. 1, taken along the line B—B. In this latter drawing which is an enlarged cross sectional view, it will be seen that the scrapers appear as circles from which arcuate portions have been removed. Thus the scrapers have concave arcuate sides 17 with longitudinally extending ridges 18 between the arcuate sides. The shafts 1 and 2 are so mounted with respect to one another that the ridges 18 of one scraper scrape the arcuate sides 17 of the other scraper. It will be understood from what is said above that one of the scrapers will be rotated while the other is locked in a stationary position. The Geneva wheel system disclosed above causes the alternate rotation of one of the scrapers through 90° while the other scraper is stationary, but appropriate mechanism can be produced for alternately causing one of the scrapers after the other to rotate through any odd multiple of 90° while the other is stationary, so that in this way it will be seen that each scraper scrapes each arcuate wall of the other at a regularly recurring interval.

Figures 3, 4:
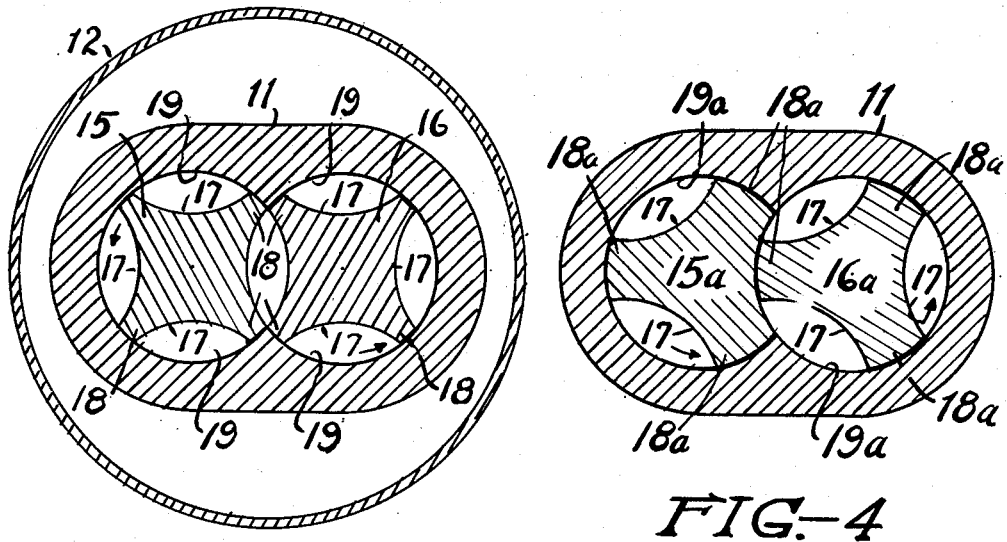
Fig. 3 is a cross section taken along the line B—B of Fig. 1, particularly showing the structure of the scraping mechanisms and the side walls of the reaction vessel.
Fig. 4 is a section of an apparatus similar to that shown in Figs. 1 and 3 but with scrapers of a different shape.

Fig. 3 also shows the shape of the inner wall of the main housing 11 which has a partially circular cross section as shown at 19. It will be understood that the ridges 18 will thus scrape the walls 19 at regularly recurring intervals and thus remove any deposited material therefrom.

Below the main housing a sealing and solid removal mechanism is provided for removing the material scraped from the scraping members and from the walls. Such material will drop below the scrapers into a third housing 20 which contains sealing and removal mechanism. A shaft 21 is preferably aligned with shaft 1, a portion of which protrudes through the lower main bearing 31. The shaft 21 has a square head or end 22 which fits loosely into a square hole in the lower end of the shaft 1, so that when the shaft 1 is rotated shaft 21 will also follow. The shaft 21 then passes through the sleeve 23 in a funnel shaped adaptor 24 which is rigidly placed in the housing 20. Shaft 21 is free to rotate in the sleeve 23 but is rigidly connected to a circular plate 27 below the adapter, which plate is thus rotated with the shaft. This plate 27 is fitted with a hole 28 into which solid materials will drop from the interior of the main housing whenever the said hole 28 is aligned with the hole 25 in the funnel shaped adapter. Below plate 27 there is a second plate 29a which is not rotatable and which is held firmly against the lower side of the rotating plate 27 by means of bolts fitted with springs 29. This second plate is provided with a hole 30 which is off center with respect to the hole 25 in the adapter.

If desired, several holes 28 may be provided in plate 27 so that the discharge becomes more nearly continuous. The operation of the seal can be readily understood from what has been said. The rotating plate 27 collects a small amount of solid from the adapter when holes 25 and 28 are aligned. At this time there is no free passage from the main housing out of the system. When plate 27 rotates so as to bring holes 28 and 30 into alignment the collected solid material is dropped out of the system, but at this time the hole 25 is effectually sealed by the solid part of plate 27. It will be understood that the particular sealing device shown is not essential to the scraping device; other forms of seals may be employed, such as screw conveyors with a varying pitch so that an internal pressure may be held, released continually, and the solid material continuously removed from the apparatus.

Figure 5:
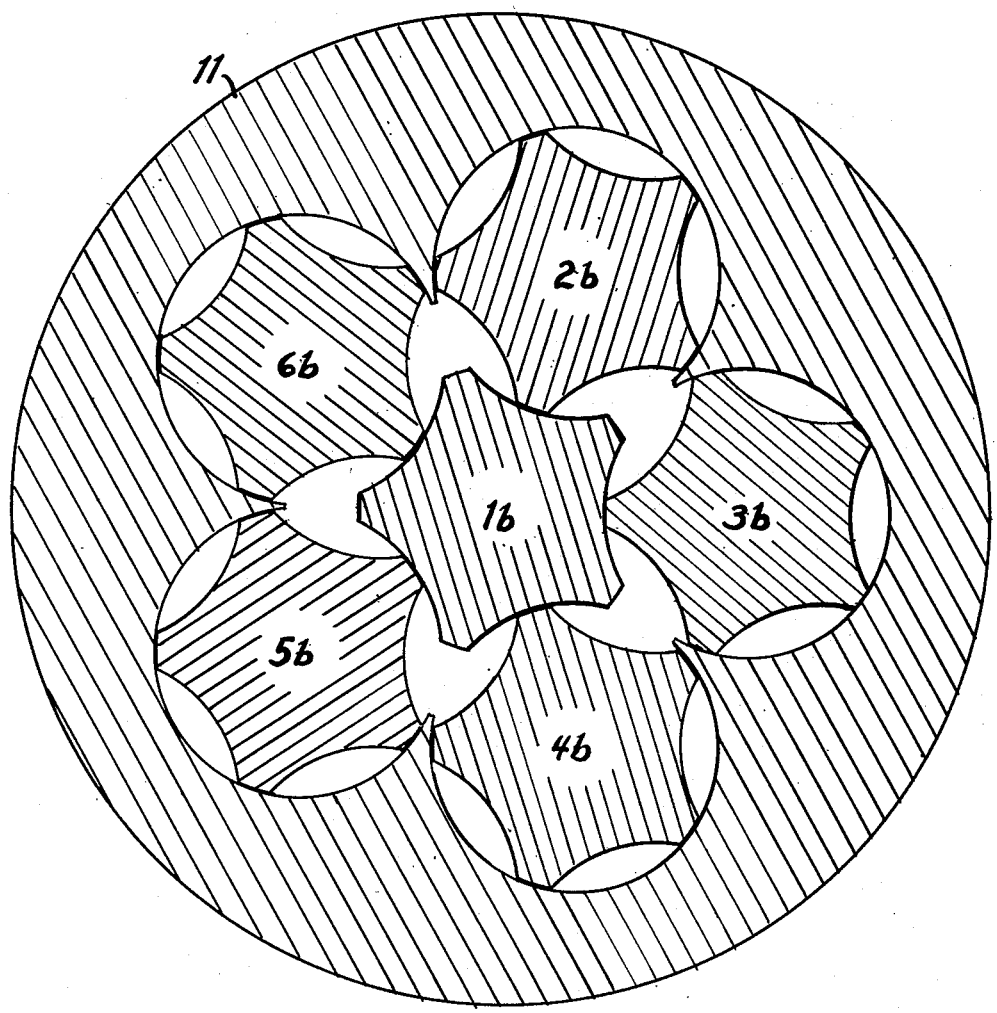
Fig. 5 is a similar section showing scrapers in another arrangement and shape together with the side walls arranged for this particular scraper.

In Fig. 4 there is shown a cross section of another form of the scraping mechanism. This construction corresponds to Fig. 3 in that two scrapers 15a and 16a are provided, but differs in that each scraper has three arcuate sides 17 separated by ridges 18a instead of four. The housing side walls 19a are also shown for this type of mechanism. In Fig. 5 a cross section is shown corresponding to Figs. 3 and 4 but for a modified design in which there are six parallel scraper members 1b to 6b. The scrapers are provided each with five arcuate sides and the members are mounted with one in the center and the remaining five spaced regularly about it. This device operates similarly to the one described in detail above. The central shaft member 1b is rotated at least part of a turn while the surrounding five members 2b, 3b, 4b, 5b, and 6b, are held in the stationary position. The five are then rotated while the center one is stationary.

It will be appreciated that the drawing shows only a limited number of the different types and shapes of scrapers that can be made. Thus, any number of scrapers may be arranged around a central scraper although it is probably most convenient to use four or five. The scrapers may be arranged in a single line in which case the alternate scrapers will be rotated at the same time.

The reaction vessels described above are capable of many uses as briefly described where a solid reaction product is to be separated by heating or cooling from a fluid reactant. The walls and the scraper members will be regularly scraped clean of the solid which is allowed to drop into the bottom of the main housing. The sealing and removal mechanism in the bottom permits the material to be removed continuously or at regular intervals. The device may be operated at normal atmospheric temperature, or at high temperatures such as, for example, are required for carbonization reactions or at low temperatures which are employed to cause the chilling out of solid material from the mother liquor. The device may also be operated at any desired degree of pressure either above or below normal atmospheric pressure.

The apparatus shown is preferably operated continuously and is capable of running for long periods of time without shutdown, because the walls and the scrapers will not be clogged or coated with insulating layers of the solid product. The apparatus may be fed from the bottom, just as shown, below the scrapers and the fluid products may be taken from the top, but if desired for any particular application, the feeding and withdrawal may be reversed. It is frequently desirable to provide a series of devices of the type described so as to remove the solid materials in stages. This is particularly useful in dewaxing processes where successively lower temperatures are employed in successive separators in order to produce fresh crops of wax in each separator.

The operative surfaces of the device must be closely machined so that the scraper members just clear the arcuate walls with a minimum of clearance and thus leave the minimum amount of adhering material on the wall surface. The scrapers and the walls may be made of any particular metal or alloy depending on the requirements of the particular use.

In many installations it will be desirable to provide some shaking means for preventing the solids from gathering at some point in the apparatus and hammers beating on the outside casing are useful. These may be operated electrically, magnetically or otherwise. It may also happen that the solid phase has a density less than that of the fluid phase, in which instance the apparatus should be inverted so that the driving mechanism is at the lower end and the separator or discharge mechanism at the top.

The prior description has described the device as a reaction vessel and separator, but in many instances it is used more conveniently as a reactor or phase formation vessel in connection with conventional separating devices, for example, the flow may be directly through the apparatus, into the bottom and out at the top and at such velocity that sparated solids are not permitted to settle. The stream of solid and liquid is then passed directly to a filter, centrifuge or the like. In such cases the device which is the subject of this invention serves merely as the vessel in which the formation of the solid phase takes place. That is the point at which there is most likelihood of adherence to the scrapers. Once formed, the solid materials in many cases no longer tend to adhere.

The present invention is not to be limited to any theory of the mechanism nor to any particular use to which it may be put but only to the following claims in which it is desired to claim all novelty inherent in the device.

I claim:

1. A device of the class described comprising a housing, rotatable members mounted on parallel shafts for rotation within said housing, said members each having concave arcuate side portions separated by longitudinally extending ridges, the said ridges of each member being shaped and disposed to scrape the concave arcuate side portion of an adjacent member, and driving means engaging the ends of said shafts for periodically rotating each member while the adjacent member is stationary, whereby each of the concave arcuate portions of each of said members is scraped by the ridges of another of said members at recurrent intervals.

2. A device of the class described comprising a housing, rotatable members mounted on parallel shafts for rotation within said housing, said members each having concave arcuate side portions separated by longitudinally extending ridges, the said ridges of each member being shaped and disposed to scrape the concave arcuate side portion of an adjacent member, said housing also having concave arcuate side portions separated by longitudinally extending ridges, the concave arcuate side portions of said housing being shaped and disposed to be scraped by said ridges of said rotatable members, and driving means engaging the ends of said shafts for periodically rotating each member while an adjacent member is stationary, whereby each of the concave arcuate portions of said members and of said housing is scraped by the ridges of said members at recurrent intervals.

3. A device of the class described comprising a housing, rotatable members mounted on parallel shafts for rotation within said housing, said members each having concave arcuate side portions separated by longitudinally extending ridges, said ridges of each member being shaped and disposed to scrape the concave arcuate side portion of an adjacent member, said housing having an inlet for material to be processed near corresponding ends of said members and an outlet for processed material near the other ends of said members, and driving means engaging the ends of said shafts for periodically rotating each member while the adjacent member is stationary, whereby each of the concave arcuate portions of each of said members is scraped free of materials by the ridges of another of said members at recurrent intervals.

4. A device of the class described comprising a housing, upstanding rotatable members mounted on parallel shafts for rotation within said housing, said members each having concave arcuate side portions separated by longitudinally extending ridges, said ridges of each member being shaped and disposed to scrape the concave arcuate side portion of an adjacent member, driving means engaging the ends of said shafts for periodically rotating each member while the adjacent member is stationary, and means operated by one of said shafts in the lower portion of said housing for removing from said housing materials scraped from the concave arcuate side portions of said members by the ridges of adjacent members.

5. A device of the class described comprising a housing, a jacket for a temperature regulating medium surrounding said housing, rotatable members mounted on parallel shafts for rotation within said housing, said members each having concave arcuate side portions separated by longitudinally extending ridges, the said ridges of each member being shaped and disposed to scrape the concave arcuate side portion of an adjacent member, and driving means engaging the ends of said shafts for periodically rotating each member while the adjacent member is stationary, whereby materials deposited on said concave arcuate portions of said members are scraped therefrom by the ridges of adjacent members at recurrent intervals.

6. A device of the class described comprising a housing, a pair of rotatable members mounted on parallel shafts for rotation within said housing, said members each having a plurality of concave arcuate side portions separated by longitudinally extending ridges, the said ridges of each of said members being shaped and disposed to scrape the concave arcuate side portions of the adjacent member, and driving means engaging the ends of said shafts for periodically rotating one of said members while locking the other of said members stationary, whereby each of the concave arcuate portions of each of said members is scraped by the ridges of the other of said members at recurrent intervals.

7. A device of the class described comprising a housing, a plurality of rotatable upstanding members mounted on vertical parallel shafts for rotation within said housing, said members each having a plurality of concave arcuate side portions separated by longitudinally extending ridges, the said ridges of each of said members being shaped and disposed to scrape the concave arcuate side portions of adjacent members, and driving means engaging the ends of said shafts for intermittently rotating some of said members while other members are stationary, whereby the ridges of the rotated members scrape the concave arcuate side portions of stationary members at recurrent intervals.

8. A device of the class described comprising a housing, a plurality of rotatable members mounted on parallel shafts for rotation within said housing, one of said members being centrally located in said housing and surrounded by the other members, said members each having a plurality of concave arcuate side portions separated by longitudinally extending ridges, said housing also having a plurality of arcuate side portions separated by longitudinally extending ridges, the ridges of said centrally located member being shaped and disposed to scrape the concave arcuate side portions of said surrounding members and the ridges of said surrounding members being shaped and disposed to scrape the concave arcuate side portions of said central member and of said housing, and driving means engaging the ends of said shafts for rotating said surrounding members while said central member is stationary and for rotating said central member while said surrounding members are stationary, whereby the concave arcuate portions of said members and of said housing are scraped at recurrent intervals to remove materials therefrom.

RUDOLPH C. SCHULTZ.

References Cited in the file of this patent

UNITED STATES PATENTS

| Number | Name | Date |
|---|---|---|
| 1,356,296 | La Casse | Oct. 19, 1920 |
| 1,465,752 | Yates | Aug. 21, 1923 |
| 1,757,153 | Thompson | May 6, 1930 |